July 1, 1941.  H. G. FERGUSON  2,247,725
TRACTOR
Filed July 8, 1939  4 Sheets-Sheet 1

Inventor
Henry G. Ferguson,
By
Att'y

July 1, 1941.　　　H. G. FERGUSON　　　2,247,725
TRACTOR
Filed July 8, 1939　　　4 Sheets-Sheet 2
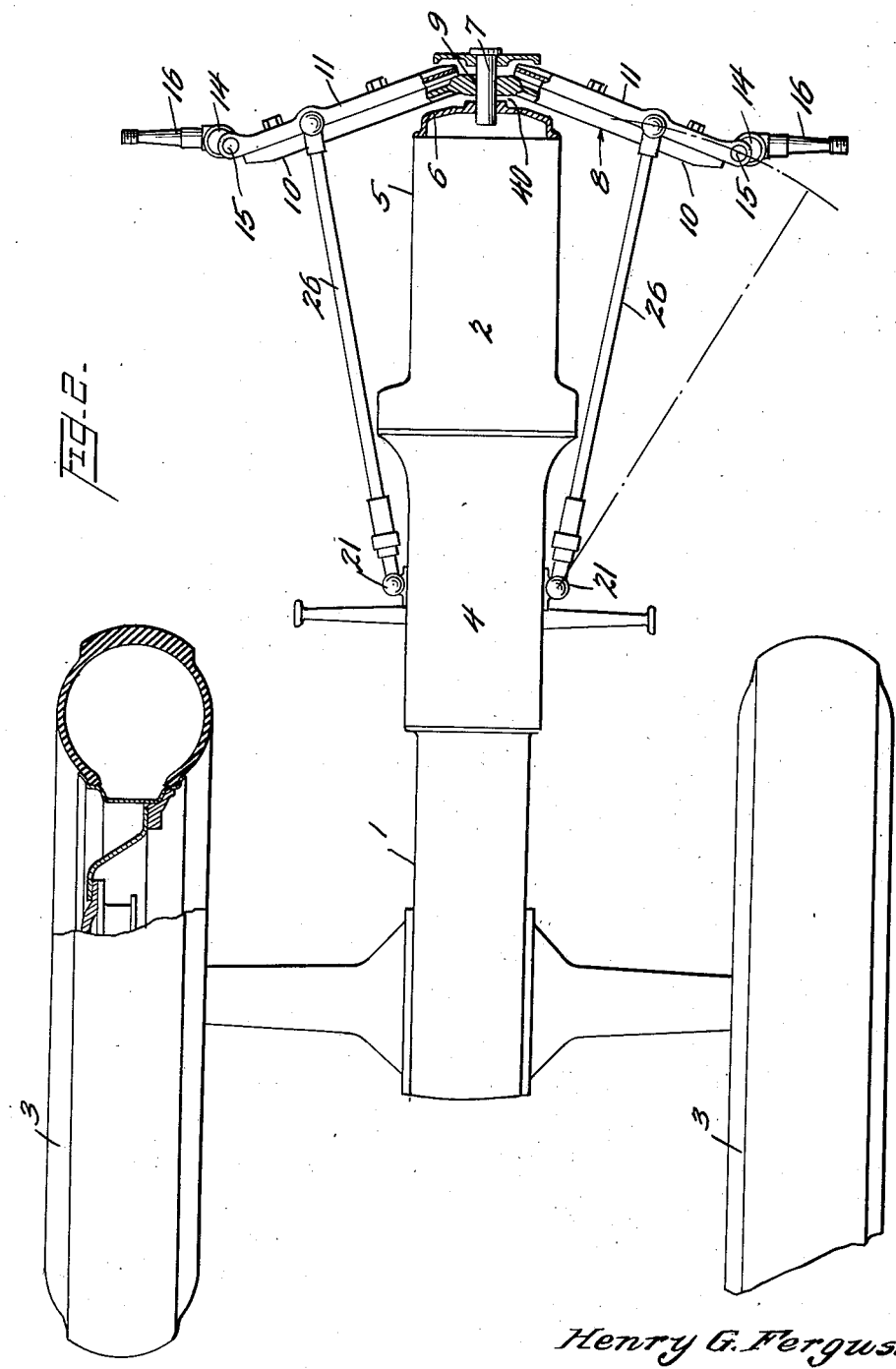
FIG.2.
Henry G. Ferguson,
BY 
ATTORNEY July 1, 1941. H. G. FERGUSON 2,247,725
TRACTOR
Filed July 8, 1939 4 Sheets-Sheet 3
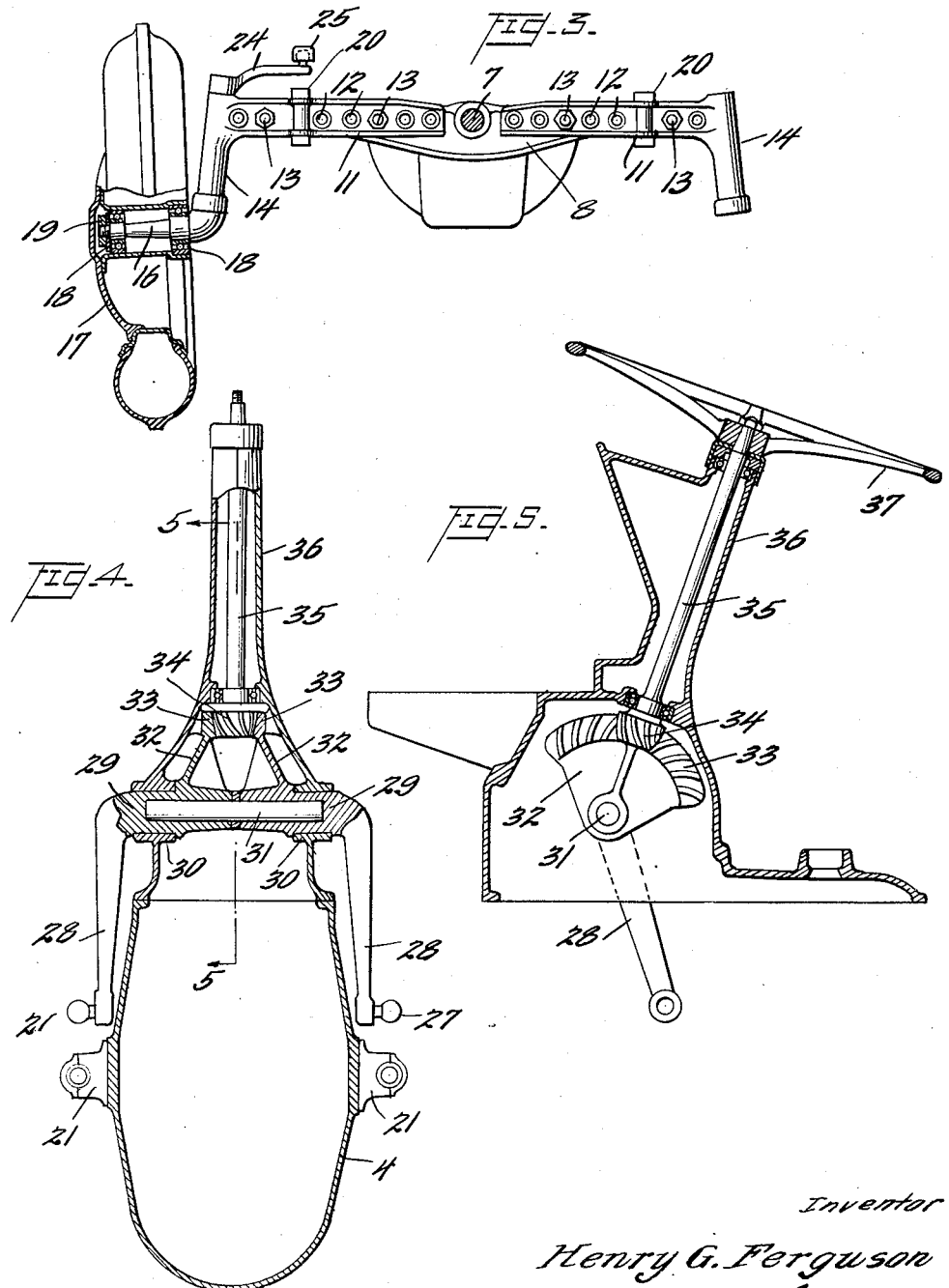
Inventor
Henry G. Ferguson
BY
ATTORNEY

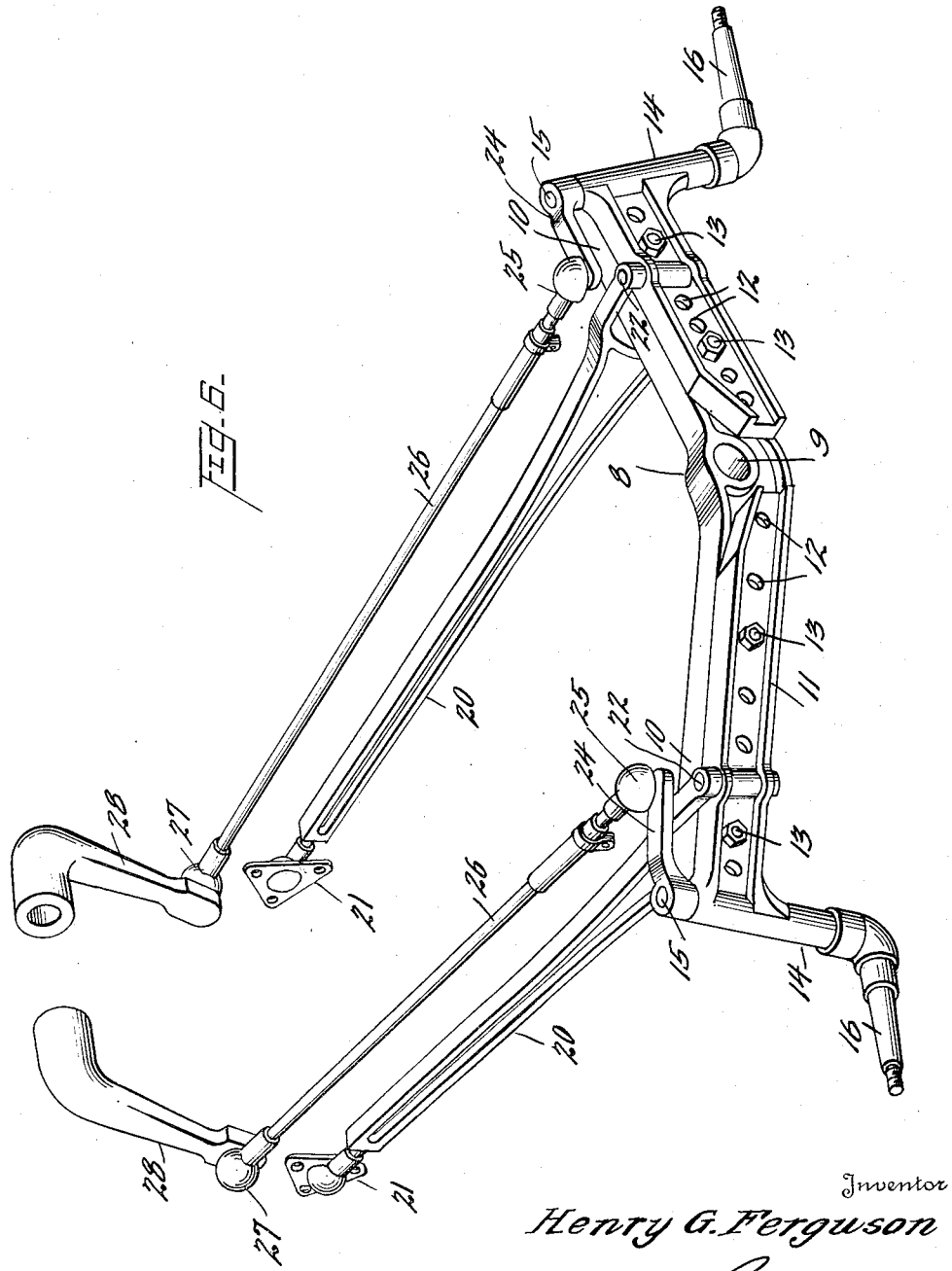

Patented July 1, 1941

2,247,725

UNITED STATES PATENT OFFICE 2,247,725

TRACTOR

Henry George Ferguson, Belfast, Northern Ireland

Application July 8, 1939, Serial No. 283,481

14 Claims. (Cl. 280—93)

This invention is directed to an improvement in tractors wherein more particularly the adjustably controlled spread of the front wheels without the slightest interference with the normal steering control is a characteristic feature.

The large and varied use of tractors, particularly for use in connection with farm implements, has demonstrated the great necessity of providing for variable lateral spread of the front wheel ground contact, to insure stability of the tractor under varying ground conditions or to provide for a particular front wheel spread which will best accommodate the tractor to the particular ground or road conditions where it is being handled. One particular difficulty in connection with adjustable or variable ground spread of the front wheels of a tractor is that of maintaining completely flexible and perfectly controlled steering mechanism for the front wheels under any and all conditions of front wheel spread without the use of complicated mechanism to this end and without the necessity of changing or correcting the steering mechanism connections at any time regardless of the front wheel spread adjustment.

The primary object of the present invention is, therefore, the provision of a tractor in which the front wheels are supported on axle bars mounted for adjustment longitudinally of the axle proper and designed to be rigidly fixed in any position of adjustment longitudinally of such axle proper, whereby the wheels may, within the limits of the adjustment provided, be given a minimum spread in ground contact, a maximum spread or any desired intermediate position without requiring adjustment of the steering mechanism.

A further object of the invention is the provision of means whereby the radius rods connected to the axle proper and the steering rods connected to the wheel shafts of the front wheels are mounted to compel their movement from vertically aligned centers to thereby insure simplicity of steering without liability, incident to change of centers, from buckling or distorting the rods.

A further object of the invention is the arrangement of manually controlled steering mechanism by which the steering rods, through the use of a single steering wheel or manually operable element, are compelled to function in a simple direct manner for steering purposes.

The invention is illustrated in the accompanying drawings, in which:

Figure 2 is a plan of the same.

Figure 3 is a view in elevation, partly in section, showing more particularly the construction of the front axle as a whole and the mounting of one of the front wheels.

Figure 4 is a section on line 4—4 of Figure 1.

Figure 5 is a section on line 5—5 of Figure 4.

Figure 6 is a broken perspective view illustrating the mounting of the front axle proper, the wheel carrying bars and the connected parts.

Figure 1:
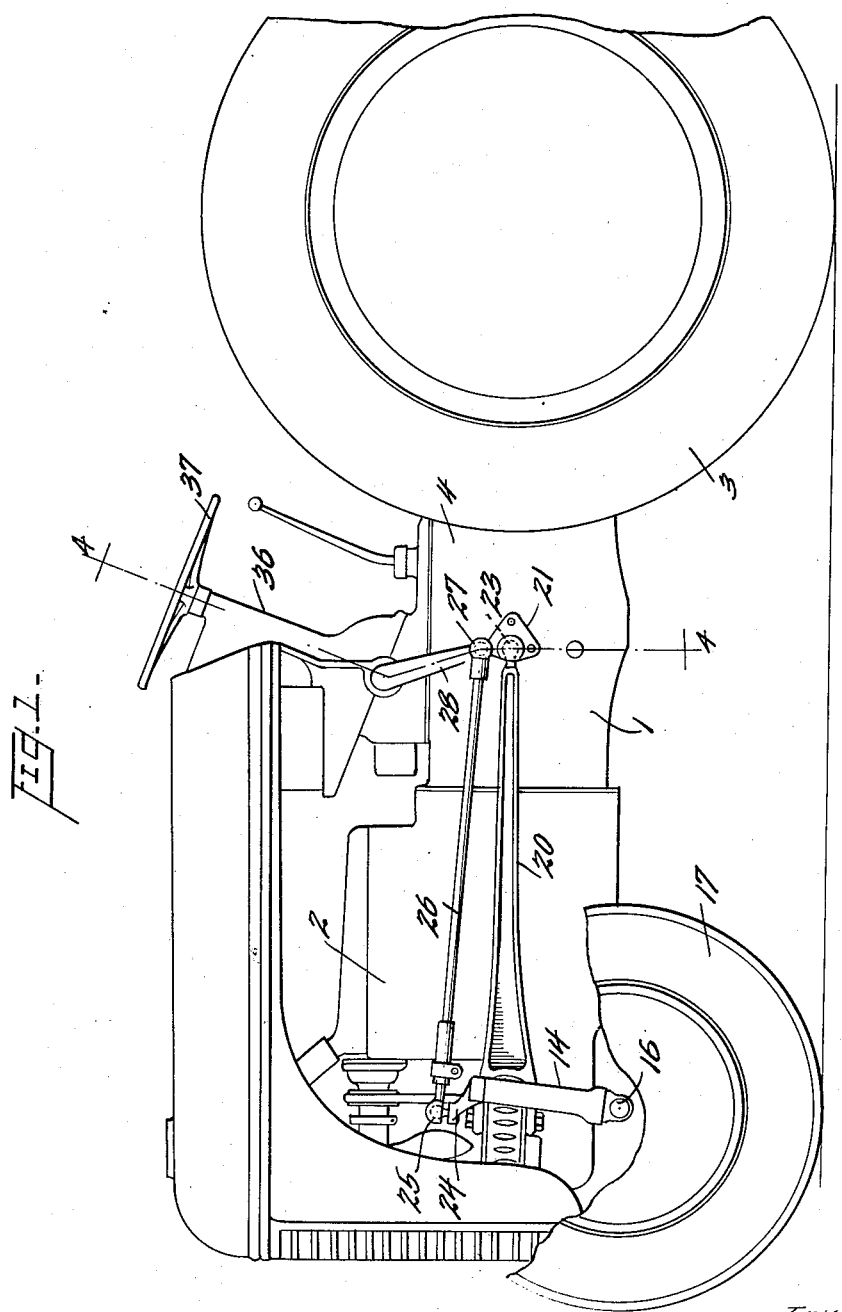
Figure 1 is a side view of the tractor with a portion of the engine hood removed.

The improved tractor is provided with a frame 1 having a motor 2, rear wheels 3, transmission 4 and other typical parts with which the invention is not particularly concerned and which may be conventional and of any desired character.

The forward end 5 in the form shown constitutes the engine housing and this is provided with an appropriate bracket 6 in which is rigidly mounted a king pin 7 extending outwardly and in the horizontal plane of the frame.

On the king pin is mounted what may be termed the axle proper 8 constituting a bar of appropriate strength centrally formed with an opening 9 which is mounted on the king pin 7 with appreciable freedom of play on said king pin, both angularly and forward and backward. From the king pin opening the axle proper extends in both directions in the form of rearwardly inclined axles 10.

Wheel-carrying bars 11 are arranged to bear against the outer faces of the axle sections 10, both bars 11 and sections 10 being formed with a plurality of openings 12 to receive bolts 13 whereby the wheel-carrying bars 11 are adjustable longitudinally of the axle sections toward and from the king pin and with the use of the bolts, rigidly held in such adjustment. The outer ends of the wheel-carrying bars have depending columns 14 in which are rotatably mounted wheel-carrying shafts 15 having integral wheel spindles 16 at their lower ends. Ground wheels 17 of any preferred or conventional form, being here shown as rubber tired disk-type wheels, are supported on the spindles 16 through appropriate anti-friction bearings 18 and securing means 19.

Radius rods 20 extend from the wheel-carrying bars 11 near their free ends to a mounting 21 on the engine or transmission case, the forward ends of the radius rods being preferably forked and connected by a bolt 22 to an appropriate enlargement on the bars 11 to thus define a pivotal connection at the forward ends of the radius rods.

The rear end of each radius rod has a universal mounting at 23 in the mounting 21, so that the rods can follow outward and inward adjustment of the bars and also rocking movement of the bars and the axle 8 about the pin 7. In all positions the rods 20 serve to brace the axle 8 and bars 11 against bending and, owing to the deep forked connection they also brace the axle and bars against torsional deflection. The axle 8 is arranged to be capable of slight torsional deflection to accommodate the slight tendency of the vertical axes of the pivot bolts 22 to go out of vertical alignment when they move up and down round the universal mountings 23 due to rocking movement of the axle.

The upper end of the wheel shaft 15 is provided with a fixed lateral arm 24 to which through the medium of a universal joint connection 25 is secured a steering rod 26, the rear end of which has a universal joint connection 27 to the steering arm 28. The radius rods are provided near the free ends of the axle sections 11 and the steering rods 26 are so arranged that when the wheels are straight ahead, the forward connections of the radius rod and steering rod on each side are in vertical alignment. The rear connections of the radius rod and steering rod on each side, that is the universal connections 23 and 27, are also at this time in vertical alignment.

The control of the steering rods is illustrated more particularly in Figures 4 and 5. The upper ends of the steering arm 28 have inwardly projected bearing sections 29 supported in bearings 30 of the frame of the tractor and connected to maintain alignment by a rod 31 which is rotatably mounted in each extension 29. Secured on the extensions 29 are webs 32 formed at the upper ends with arcuate toothed sectors 33. A pinion 34 cooperates with both sectors 33 and is supported on a steering shaft 35 rising through a column 36 of the frame structure and carrying a steering wheel 37 or like manually operable element.

The shaft 35 will, of course, be appropriately mounted in anti-friction bearings.

It will be apparent from the above that the wheel-carrying bars may be adjusted laterally to increase the spread of the wheel ground contact to the maximum permitted by the construction; may be adjusted to their inward limits as in the position illustrated in Figure 2; or to any intermediate position. Thus, within the limits permitted, the wheel spread may be controlled to suit the requirements in the particular ground or road conditions in which the tractor is being used. Naturally a wide spread will materially increase the stability of the tractor as a whole while the narrower spread will provide for less over-all width of the tractor when being transported along the road. The conditions requiring varying spread adjustments are well understood by those experienced in the handling of tractors, particularly on the farm, and there is no necessity for discussing such numerous instances here.

When the wheel-carrying bars are adjusted they move around the mountings 23 as centres. The axle proper has therefore to move forward or backward and this is permitted by arranging for play on the king pin 7 to permit such slight forward or backward movement of the axle, the space being indicated at 40 in Figure 2. Owing to the forward and rear connections of the bracing rods 20 and steering rods 26 being in vertical alignment in the straight ahead position, and owing to the backward and forward movement of the axle, the pivot bolts 22, during adjustment of the bars 11, follow the arcuate path of the universal connections 23. Thus the angular position of the steering arms 24 with reference to the bars 11 is not altered from which it follows that the wheels and wheel-carrying bars execute a parallel movement (the axle parts 10 being straight) and the steering is not affected and no compensating adjustment of the steering mechanism is necessary. Of course, the axle proper, and therefore the wheel bars and wheels, are capable of rocking movement relative to the king bolt to permit irregularities in the vertical movements of the wheels relative to each other as necessary in this type of tractor.

The steering mechanism proper is extremely simple, involving a single pinion for operating simultaneously arcuate sectors and through these sectors the steering rods.

What is claimed to be new is:

1. A tractor including a front axle capable of forward and backward movement, wheel-carrying bars adjustable in both directions longitudinally of the axle, a radius bar connected to each bar and a fixed part of the tractor, wheels carried by the wheel-carrying bars, and a separate steering rod connected to each wheel the radius bars constraining the wheel-carrying bars to move during adjustment through an arcuate movement about the rear ends of the steering rods.

2. A construction as defined in claim 1, wherein the rear ends of the radius bars and steering rods have universal connections in vertical alignment when the wheels are in the straight ahead position and wherein the front axle is capable of rocking movement in a transverse plane.

3. A tractor comprising a body, a king pin projecting forwardly of the body, an axle proper mounted loosely on the pin for angular and backward and forward movement and inclined rearwardly of the tractor body on each side of the king pin, wheel-carrying bars, the bars and axles being formed with openings for registry in adjustment of the bars longitudinally of the axle, and means for fixing the bars and axle through the registered openings.

4. A construction as defined in claim 3, including a radius rod for the wheel-carrying bar on each side of the king pin, and a universal mounting for the rear end of said rod on the tractor body, the radius rod having pivotal connection with the wheel-carrying bar.

5. A tractor comprising a frame, a king pin projecting in advance of the frame, an axle mounted for angular and backward and forward movement on the king pin, wheel-carrying bars carried by the axle on each side of the king pin, means for fixing the bars in adjusted positions on the axle relative to the king pin, wheels carried by the wheel-carrying bars, radius rods connected to the said bars and to the frame, steering mechanism on the vehicle frame, and steering rods intermediate the mechanism and the wheels.

6. A construction as defined in claim 5, wherein the ends of the steering rods connected to the steering mechanism are in vertical alignment with the rear ends of the radius rods when the wheels are in the straight ahead position, said rear ends being universally attached to the frame.

7. A construction as defined in claim 5, wherein the steering mechanism includes steering arms mounted for swinging movement on the frame and having universal connection with the rear ends of the steering rods, a sector carried by each steering arm, and a manually controlled pinion engaging with the sectors.

8. A tractor including a body, an axle mounted for angular and limited backward and forward movement with respect to the body, wheel-carrying bars mounted for adjustment longitudinally of the axle, wheels carried by the bars, radius rods pivotally connected to the bars and universally connected to the body, and steering rods pivotally connected at the forward ends to the wheels and pivotally connected at the rear to steering mechanism, the radius rods maintaining substantial rigidity of the axle and wheel-carrying bars while constraining the bars, during adjustment, to follow an arcuate movement about the rear ends of the steering rods so that the steering action is undisturbed.

9. A tractor comprising a frame, an axle mounted thereon, steering ground wheels, parts carrying said wheels and adjustably attached to said axle to permit adjustment of the wheel track, a steering mechanism, a separate fore-and-aft steering rod for each wheel, each rod being pivotally connected at the rear end to said mechanism and having a pivotal connection with the corresponding wheel at the front end, and means constraining said wheel-carrying parts to execute, during track adjustment, a parallel arcuate movement corresponding to that of the connections of the steering rods with the wheels so that the latter execute a parallel movement.

10. A tractor comprising a frame, an axle mounted thereon, steering ground wheels, parts carrying said wheels and adjustably attached to said axle to permit adjustment of the wheel track, a steering mechanism, a separate steering rod for each wheel, each rod being pivotally connected at one end to said mechanism and having a pivotal connection with the corresponding wheel at the other end, and means constraining said parts to execute, during track adjustment, a parallel arcuate movement corresponding to that of the connections of the steering rods with the wheels so that the latter execute a parallel movement, said constraining means comprising bracing rods pivotally connected to the frame at the rear ends and each pivotally connected at the forward end to the corresponding wheel-carrying part, the said connections being in vertical alignment with the pivotal connections of the steering rods when the wheels are in the straight ahead position, and the axle having an attachment to the frame allowing forward and backward movement of the axle with reference to the frame.

11. A tractor comprising a frame, an axle mounted thereon, steering ground wheels, parts carrying said wheels and adjustably attached to said axle to permit adjustment of the wheel track, a steering mechanism, a separate steering rod for each wheel, each rod being pivotally connected at one end to said mechanism and having a pivotal connection with the corresponding wheel at the other end, and means constraining said parts to execute, during track adjustment, a parallel arcuate movement corresponding to that of the connections of the steering rods with the wheels so that the latter execute a parallel movement, the axle having straight, rearwardly swept outer end portions along which said wheel-carrying parts are adjustable.

12. A tractor comprising a frame, an axle mounted thereon, steering ground wheels, parts carrying said wheels and adjustably attached to said axle to permit adjustment of the wheel track, a steering mechanism, a separate steering rod for each wheel, each rod being pivotally connected at one end to said mechanism and having a pivotal connection with the corresponding wheel at the other end, and means constraining said parts to execute, during track adjustment, a parallel arcuate movement corresponding to that of the connections of the steering rods with the wheels so that the latter execute a parallel movement, said constraining means comprising bracing rods pivotally connected to the frame at the rear ends and each having a forked pivotal connection at the forward end to the wheel-carrying parts, the said connections being in vertical alignment with the pivotal connections of the steering rods when the wheels are in the straight ahead position, and the axle having an attachment to the frame allowing forward and backward movement of the axle with reference to the frame.

13. A tractor comprising a frame, an axle mounted thereon, steering ground wheels, parts carrying said wheels and having a pivotal connection therewith and adjustably attached to said axle to permit lateral movement thereon to adjust the wheel track, a steering mechanism, a separate steering rod for each wheel, each rod extending fore and aft and being pivotally connected at one end to said mechanism and having a pivotal connection with the corresponding wheel at the other end, and means constraining the pivotal connections of said wheels to execute the same movement as their pivotal connections to said rods as a result of track adjustment.

14. A tractor comprising a frame, an axle mounted thereon, steering ground wheels, parts carrying said wheels and adjustably attached to said axle to permit adjustment of the wheel track, a steering mechanism, a separate steering rod for each wheel, each rod being pivotally connected at one end to said mechanism and having a pivotal connection with the corresponding wheel at the other end, and means constraining said wheels to follow a parallel movement as a result of track adjustment so that their alignment is unaffected by said adjustment, the axle comprising straight outer parts swept rearwardly for receiving the wheel-carrying parts.

HENRY GEORGE FERGUSON.